(12) United States Patent
Pathak et al.

(10) Patent No.: US 7,437,268 B1
(45) Date of Patent: Oct. 14, 2008

(54) SYSTEMS AND METHODS FOR ANALYZING DATA

(75) Inventors: Heeren Pathak, Woburn, MA (US);
Seth H. Hitchings, Arlington, MA (US);
Foti Barlos, Winchester, MA (US);
Jefferson M. Kommers, Somerville, MA (US); John C. Artz, Jr., Woburn, MA (US)

(73) Assignee: Vignette Corporation, Austin, TX (US)

( * ) Notice: Subject to any disclaimer, the term of this patent is extended or adjusted under 35 U.S.C. 154(b) by 0 days.

(21) Appl. No.: 10/738,817

(22) Filed: Dec. 17, 2003

Related U.S. Application Data (60) Provisional application No. 60/434,204, filed on Dec. 17, 2002.

(51) Int. Cl.
*G06F 11/30* (2006.01)
*G06F 17/50* (2006.01)

(52) U.S. Cl. ............... 702/182; 702/186; 705/7; 706/12; 709/223; 709/224

(58) Field of Classification Search ............... 702/81, 702/127, 182, 183, 186, 188; 705/7, 11, 705/26, 1; 701/29; 713/200; 709/206, 224, 709/244, 245, 223; 707/3; 706/12
See application file for complete search history.

(56) References Cited

U.S. PATENT DOCUMENTS

| | | | |
|---|---|---|---|
| 5,557,717 A | | 9/1996 | Wayner |
| 5,732,218 A | | 3/1998 | Bland et al. |
| 5,933,818 A | * | 8/1999 | Kasravi et al. ............ 706/12 |
| 6,041,335 A | | 3/2000 | Merritt et al. |
| 6,112,186 A | | 8/2000 | Bergh et al. |
| 6,119,103 A | | 9/2000 | Basch et al. |
| 6,144,962 A | | 11/2000 | Weinberg et al. |
| 6,205,472 B1 | | 3/2001 | Gilmour |
| 6,321,206 B1 | | 11/2001 | Honarvar |
| 6,430,539 B1 | | 8/2002 | Lazarus et al. |
| 6,456,305 B1 | | 9/2002 | Qureshi et al. |
| 6,509,898 B2 | | 1/2003 | Chi et al. |
| 6,559,882 B1 | | 5/2003 | Kerchner |
| 6,606,657 B1 | | 8/2003 | Zilberstein et al. |
| 6,629,136 B1 | | 9/2003 | Naidoo |

(Continued)

OTHER PUBLICATIONS

Cabena, Peter et al., Intelligent Miner for Data Applications Guide, IBM RedBook SG24-5252-00, Mar. 1999.

(Continued)

*Primary Examiner*—John H Le
(74) *Attorney, Agent, or Firm*—Sprinkle IP Law Group (57) ABSTRACT

Systems and methods for collecting and categorizing data and initiating analyses of the data based on the detection of conditions associated with the data. One embodiment is a method including the steps of collecting data from a data source, categorizing or otherwise transforming the data, determining when one or more predetermined conditions relating to the collected data are met, and initiating one or more corresponding analyses of the data upon detection of the predetermined conditions. The detection of the predetermined conditions and the initiation of corresponding analyses can be recursive, in that the results of one analysis can be collected and then re-analyzed, with or without other data. The analyses can be performed cooperatively by multiple devices. The method can be entirely automated in order to improve the efficiency of the analyses.

53 Claims, 2 Drawing Sheets

U.S. PATENT DOCUMENTS

| | | | |
|---|---|---|---|
| 6,640,215 B1 | 10/2003 | Galperin et al. | |
| 6,732,331 B1 | 5/2004 | Alexander | |
| 6,757,740 B1 | 6/2004 | Parekh et al. | |
| 6,782,350 B1 * | 8/2004 | Burnley et al. | 702/186 |
| 6,839,682 B1 | 1/2005 | Blume et al. | |
| 7,065,566 B2 * | 6/2006 | Menard et al. | 709/223 |
| 7,237,023 B2 * | 6/2007 | Menard et al. | 709/224 |
| 2001/0037321 A1 | 11/2001 | Fishman et al. | |
| 2002/0138316 A1 * | 9/2002 | Katz et al. | 705/7 |
| 2002/0184065 A1 * | 12/2002 | Menard et al. | 705/7 |
| 2004/0138934 A1 * | 7/2004 | Johnson et al. | 705/7 |

OTHER PUBLICATIONS

Datasage.com News and Events—DataSage Releases netCustomer, the 1st Individualization Solution for E-Commerce, retrieved Feb. 16, 2005 from Archive.org, 3 pgs, Aug. 2, 1999.

Datasage.com—Executive Overview—Retail, Retail Data Mining Executive Overview, retrieved Feb. 16, 2005 from Archive.org, 7 pgs, Dec. 1998.

Gallant, Steve et al., Successful Customer Relationship Management in Financial Applications (Tutorial PM-1), Conference on Knowledge Discovery in Data, ISBN:1-58113-305-7, pp. 165-241, 2000.

Vignette Corporation to Acquire DataSage, Inc., retrieved from Archive.org Feb. 16, 2005, 3 pgs, Jan. 10, 2000.

Chapman, Pete et al., CRISP-DM 1.0—Step-by-step data mining guide, retrieved from www.crisp-dm.org Feb. 17, 2005, pp. 1-78, 2000.

XSL Transformations (XSLT) Version 1.0, W3C Recommendation, www.w3.org/TR/1999/REC-xslt-19991116, pp. 1-87, Nov. 16, 1999.

* cited by examiner

SYSTEMS AND METHODS FOR ANALYZING DATA

RELATED APPLICATIONS

This application claims priority to U.S. Provisional Patent Application No. 60/434,204, entitled "System And Method For Providing An Analysis Framework", by Barlos, et al., filed Dec. 17, 2002, which is hereby fully incorporated by reference as if set forth herein in its entirety.

BACKGROUND OF THE INVENTION

Companies often generate large amounts of data in the normal course of operating their respective businesses. This data may then be evaluated by the companies in order to evaluate their business operations. The examination of the data may be for various specific purposes, such as determining how many sales have been made, how much money has been generated through these sales, how well particular business units are operating, and so on.

There may be many different aspects of a business that need to be examined in order to ensure that the business is being properly managed. Each of these aspects may be associated with various different types of data. It may therefore be necessary to examine each of the different types of data associated with a particular aspect of the business in order to properly analyze it. For example, in order to determine whether a particular marketing initiative is having a desired effect, it may be necessary to examine relevant contact information, purchase orders, revenues, and so on.

Often, the information that is associated with a particular aspect of a business is collected specifically for the purpose of analyzing that aspect of the business. The collection process may be manually initiated, and it may be necessary to review the information to ensure that only information which is relevant to the desired analysis is included. The information may then be manually analyzed. This process may, however, be inefficient for a number of reasons.

One inefficiency may arise from the fact that the information upon which a particular analysis is based may need to be collected specifically for the purpose of the analysis. There may be no existing information upon which the analysis may be based, or the existing information may be incomplete. For example, revenues information may be available, but there may be no information on the specific sources of the revenue, so it may be impossible to analyze the strength of specific regional markets (based on the revenue generated in the respective markets).

Another inefficiency may relate to the fact that it may not be apparent in the collection of information whether or not sufficient information has been collected. If the collection of information is initiated and terminated manually, there may be no way to know exactly what (or how much) information has been collected until after the collection has ended and the information can be examined. Thus, in one instance, if the collection of information ends too soon, the information may be insufficient and it may be necessary to entirely repeat the process of collecting the information. Even if the process of collecting the information can be continued from the point at which it was previously ended, time is lost in the intervening period, and it may not be possible to prepare the resulting analysis in a timely manner.

Another inefficiency may arise from the fact that the information upon which the analysis is based may itself have to be examined before it can be determined that the data is appropriate for the analysis. For example, if the desired analysis is to determine the strength of specific regional markets, it may be necessary to examine the collected information to ensure that only information for the relevant markets is used in the analysis. Information that is not relevant to the desired regional markets may need to be discarded before the information is analyzed.

Still another inefficiency may arise from the fact that various types of analyses may be based upon overlapping sets of information. In other words, a portion of the information upon which a first analysis is based may be common to the information upon which a second analysis is based. In collecting information for the first analysis and then collecting information for the second analysis, the collection of the common information may be repeated.

SUMMARY OF THE INVENTION

The various embodiments of the invention include systems and methods for collecting and categorizing data and initiating analyses of the collected, categorized data based on the detection of conditions associated with the collected data. One embodiment is a method including the steps of collecting data from a data source, categorizing the data, determining when one or more predetermined conditions relating to the collected, categorized data are met, and initiating one or more corresponding analyses of the data upon detection of the predetermined conditions. In one embodiment, the detection of the predetermined conditions and the initiation of corresponding analyses may be recursive, in that the results of one analysis can provide the starting data for a subsequent analysis. In one embodiment, the analyses can be performed cooperatively by multiple devices, such as a server and one or more clients, where the server provides information and/or analysis code to the clients so that the clients can perform sub-parts of the analysis. In one embodiment, the method can be entirely automated in order to improve the efficiency of the analyses.

One embodiment of the invention comprises a method including the steps of collecting data, determining whether one or more conditions are met, and if at least one of the one or more conditions are met, initiating one or more corresponding analyses of the collected data.

Another embodiment of the invention comprises a system including a data source configured to generate data, an analysis engine and a condition monitor. In this embodiment, the condition monitor is configured to monitor one or more conditions to determine whether one or more conditions are met. The condition monitor is further configured in this embodiment to cause the analysis engine to initiate one or more corresponding analyses of the data in response to determining that one of the one or more conditions is met.

Another embodiment of the invention comprises a software product that consists of computer-readable media which contain one or more instructions configured to cause one or more computers or other data processors to perform the steps of a method including collecting data, determining whether one or more conditions are met, and if at least one of the one or more conditions are met, initiating one or more corresponding analyses of the collected data.

Numerous additional embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

The invention relates generally to computer systems, and more particularly to systems and methods for collecting and categorizing data and initiating analyses of the collected, categorized data based on the detection of conditions associated with the collected data.

One embodiment of the present invention comprises a method including the steps of collecting data from a data source, categorizing the data, determining when one or more predetermined conditions relating to the collected, categorized data are met, and initiating one or more corresponding analyses of the data upon detection of the predetermined conditions. In one embodiment, the detection of the predetermined conditions and the initiation of corresponding analyses may be recursive, in that the results of one analysis can provide the starting data for subsequent analyses. In one embodiment, the method may be entirely automated in order to improve the efficiency of the analyses.

In one embodiment, data is continually collected from one or more data sources. As the data is generated by the sources, it can be categorized according to various rules that are specified by a system administrator. The categorized data is then stored in one or more corresponding storage areas, such as database tables. As the data is accumulated in the different storage areas, it is monitored to determine whether certain predetermined conditions are met. If it is determined that the data meets a particular condition, an analysis corresponding to the detected condition is initiated. This analysis may be based upon the data associated with the condition that triggered the analysis, and/or other data that has been collected in the storage areas. The analysis may result in a generation of additional data that can be stored in one or more of the storage areas.

In one embodiment, the analyses that are triggered by detection of the predetermined conditions result in the generation of data that is useful for further analysis. This data may be stored in one or more of the storage areas in a manner similar to the originally collected data. The storage of the analysis results may cause one or more of the predetermined conditions to be met, thereby triggering still further analysis. In this manner, one embodiment may perform recursive analysis of the stored data.

Figure 1:
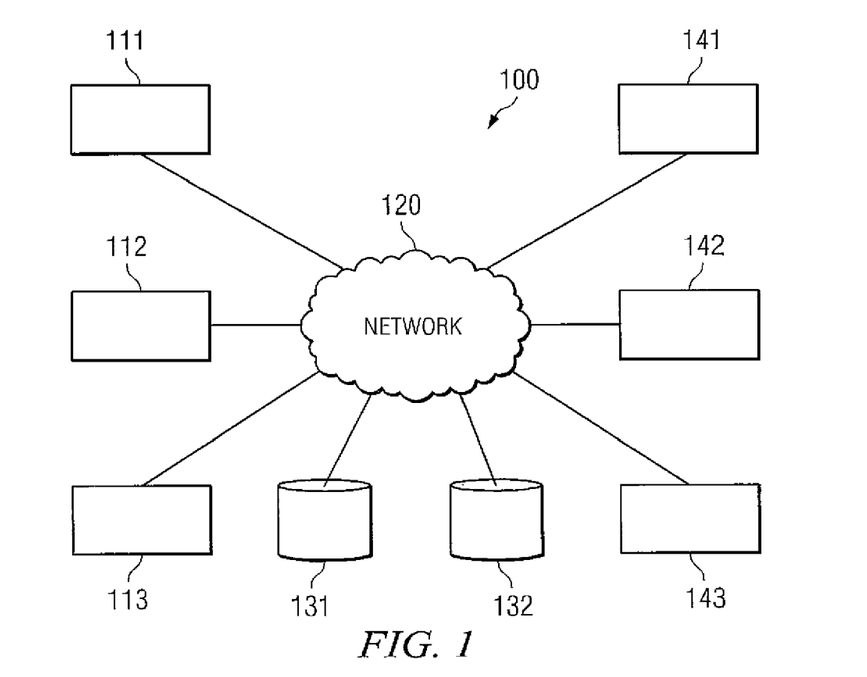
FIG. 1 is a diagram illustrating some of the basic components of a network system in accordance with one embodiment.

One embodiment of the invention is implemented in a network environment. Broadly speaking, a network is simply a collection of computers, computer peripherals, or other devices that are interconnected such that they can communicate and/or interact with each other. Referring to FIG. 1, a diagram illustrating some of the basic components of a network system 100 in accordance with one embodiment is shown. As depicted in this figure, network system 100 comprises one or more data generating devices 111-113, a network interconnect 120, one or more data storage devices 131-132, and one or more data analysis devices 141-143.

It should be noted that the network configuration illustrated in FIG. 1 is intended to be exemplary rather than limiting. Other embodiments may employ alternative configurations. For example, there may be multiple devices (e.g., clients and servers) that are interconnected by multiple individual networks. Alternatively, a device may be directly coupled to another device without an intervening network. Many such variations are possible. It should also be noted that, while one or more of the embodiments disclosed herein are implemented in a network environment, alternative embodiments may be implemented in other environments.

As noted above, the various devices coupled to network system 100 may include a variety of different types of devices. It is contemplated that data generating devices 111-113 will typically comprise computer systems (e.g., mainframe computers, workstations, personal computers or laptop computers) that are interconnected through an enterprise network. Data generating devices 111-113 may, however, also comprise other types of devices, such as printers, media readers, modems, storage devices, and the like which have internal processors that can generate corresponding data. Network interconnect 120 may comprise such an enterprise network, although this is not necessarily the case. Data generating devices 111-113 may include a variety of homogeneous or heterogeneous computer systems that run a variety of software applications.

Network interconnect 120 may include one or more local area networks (LANs), wide area networks (WANs) or other types of networks that are interconnected with each other. Each of these networks may have one of a variety of topologies (the geometric arrangement of devices on the network), may operate using one of a variety of protocols (the rules and encoding specifications for sending data, whether the network uses a peer-to-peer or client/server architecture, etc.), and may use one of a variety of different media (e.g., twisted-pair wire, coaxial cables, fiber optic cables, radio waves).

Storage devices 131-132 may include any of a variety of different types of storage devices. For instance, storage devices 131-132 may comprise bulk data storage devices such as hard disk drives, magnetic tapes, optical storage devices and the like. Storage devices 131-132 may also comprise devices having smaller amounts of storage, such as floppy disk drives, solid-state media or other removable media drives (e.g., compact flash, smart media, etc.), RAM, and the like. Storage devices 131-132 may also comprise virtual devices, such as logical partitions of one or more storage devices.

Similar to data generating devices 111-113, data analysis devices 141-143 will typically comprise computer systems. These computer systems may be homogeneous or heterogeneous, they may run various different software applications, they may use various different operating systems, they may communicate using various different protocols, and so on.

Figure 2:
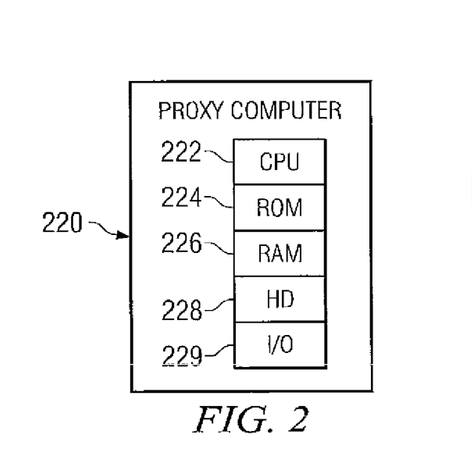
FIG. 2 is a diagram illustrating the components of an exemplary computer system in accordance with one embodiment.

In one embodiment, each of data generating devices 111-113 and data analysis devices 141-143 is implemented in a corresponding computer system capable of communicating over network interconnect 120 and processing the information communicated between the computer systems. Referring to FIG. 2, a diagram illustrating the components of an exemplary computer system are shown.

The computer system illustrated in FIG. 2 includes as a central processing unit ("CPU") 222, read-only memory ("ROM") 224, random access memory ("RAM") 226, hard disk drive ("HD") or storage memory 228, and input/output device(s) ("I/O") 229. I/O 229 can include a keyboard, monitor, printer, electronic pointing device (e.g., mouse, trackball, stylus, etc.), and the like.

The computer systems that provide platforms for the data generating and data analysis devices may each have more than one CPU, ROM, RAM, HD, I/O, or other hardware components. For simplicity, the computer system illustrated in FIG. 2 is depicted in as having one of each of the listed hardware components. It should be noted that FIG. 2 is a simplification of an exemplary hardware configuration. Many other alternative hardware configurations are possible and known to persons of skill in the art.

"Computer" and "computer system," as used herein, are intended to include any type of data processing system capable of performing the functions described herein. "Computer-readable media," as used herein, refers to any medium that can store program instructions that can be executed by a computer, and includes floppy disks, hard disk drives, CD-ROMs, DVD-ROMs, RAM, ROM, DASD arrays, magnetic tapes, floppy diskettes, optical storage devices and the like.

Figure 3:
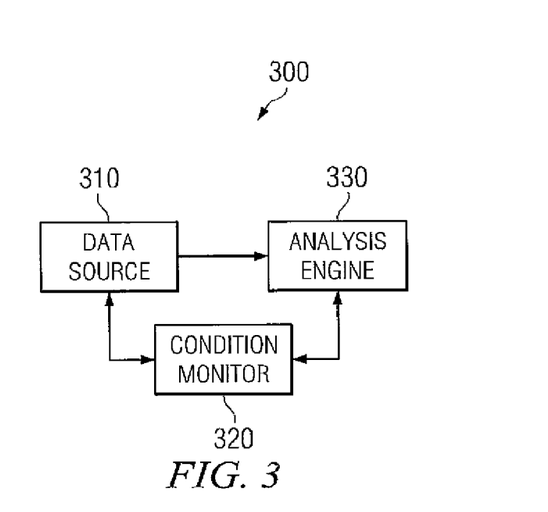
FIG. 3 is a functional block diagram illustrating a system for collecting, examining and analyzing data in accordance with one embodiment.

Referring to FIG. 3, a functional block diagram illustrating a system in accordance with one embodiment of the invention is shown. In this embodiment, system 300 comprises a data source 310, a condition monitor 320 and analysis engine 330. Data source 310 provides data that will form the basis of a desired analysis. Data source 310 may comprise the actual data generator (e.g., data generators 111-113), or it may comprise both data generators and a storage area for the generating data (e.g., data generators 111-113 and storage devices 131-132).

Condition monitor 320 monitors conditions that may trigger an analysis. These conditions may, for example, be based upon the data that is being generated/collected, or upon events that may or may not be related to this data. In one exemplary embodiment, an analysis may be triggered according to a predetermined schedule. Thus, the condition that triggers the analysis is the occurrence of an event (i.e., a temporal event such as a point in time). In another exemplary embodiment, if data source 310 includes a storage area for holding that generated data, condition monitor 320 may examine the data that is held in the storage area and determine whether the examined data meets one or more predetermined conditions that would trigger some analysis of the data (i.e., a data event, such as the accumulation of a threshold amount of data). The process of determining whether the data meets one of these conditions may be as simple as determining whether a certain amount of data has been collected. Alternatively, this process may be more complex. For instance, condition monitor 320 may determine whether a particular piece of data (e.g., a purchase order) has been generated, or it may determine whether multiple pieces of data have been collected and whether multiple conditions relating to these pieces of data have been met.

When condition monitor 320 determines that one of the predetermined conditions has been met, a corresponding analysis is triggered. This analysis may be based, in whole or in part, upon particular pieces of data that caused the predetermined condition to be met. For example, if the predetermined condition is entry of a new purchase order, the analysis may comprise determination of revenues generated by the purchase order, or the effectiveness of a marketing campaign for goods associated with the purchase order. Alternatively, the analysis may be based upon data that is entirely different from the condition that triggered the analysis. For instance, an analysis of revenues may be triggered on the last day of each month.

As noted above, when condition monitor 320 determines that a predetermined condition has been met, a corresponding analysis is triggered. The analysis is triggered by signaling or notifying analysis engine 330. If the system is configured to perform more than a single type of analysis, the notification to analysis engine 330 can indicate the condition that has been detected and/or the analysis that should be performed.

If condition monitor 320 is directly connected to analysis engine 330, the notification may be accomplished by asserting an appropriate signal that is provided by condition monitor 320 to analysis engine 330. If these two components of the system are not directly interconnected, condition monitor 320 may alternatively transmit a notification to analysis engine 330 via means such as a TCP/IP packet or even e-mail.

When analysis engine 330 is notified by condition monitor 320 that an analysis should be initiated, analysis engine 330 accesses the data from data source 310 that is necessary for the analysis. This may be accomplished in a number of ways. For instance, in one embodiment, the data may be stored in a data storage component of data source 310, and analysis engine 330 may actively retrieve the necessary data from the data storage. In an alternative embodiment, the data that is needed for the analysis may be provided to analysis engine 330. In this case, condition monitor 320 may prompt data source 310 to transmit the data to analysis engine 330. Condition monitor 320 may alternatively retrieve the needed data from data source 310 and forward it to data to analysis engine 330.

The manner in which the data needed for the analysis is provided to analysis engine 330 may alternatively be described using several well understood models. These models include a "pull" model, a "push" model and a "publish/subscribe" model.

According to the pull model, the data which is needed for the analysis is "pulled" by analysis engine 330 from data source 310 after receiving notification from condition monitor 320 that the analysis should be performed. In other words, the burden is on analysis engine 330 to retrieve the needed data.

According to the push model, the data which is needed for the analysis is provided to analysis engine 330 by "pushing" the data to analysis engine 330 (i.e., by sending the data without analysis engine 330 having first requested the data). This shifts the burden to either data source 310 or condition monitor 320 to forward the appropriate data to analysis engine 330 so that it can perform the analysis.

According to the publish/subscribe model, the data which is needed for the analysis is again provided to analysis engine 330, but analysis engine 330 may be one of several entities that receive the data. According to this model, when condition monitor 320 detects a condition corresponding to a particular analysis, some entity must determine where to send the data that is needed for the analysis, and then send the data to the appropriate recipients. This may be accomplished in various ways. In one embodiment, the data for the analysis is provided to a messaging server which is responsible for looking up the appropriate recipients and forwarding the data to these recipients. In an alternative embodiment, either condition monitor 320 or data source 310 may serve this purpose, looking up the recipients and forwarding the data to them.

The publish/subscribe model may provide some flexibility to the system, in that analyses may be performed by several different entities, rather than a single entity that serves as the analysis engine. Moreover, particular analysis engines may be designated for performing particular analyses. For example, a first analysis engine may be designated to perform a scheduled daily analysis of sales, while a second analysis engine may be designated to perform monthly analyses of sales. This may be useful to avoid problems such as overtaxing particular resources (e.g., analysis engines) or scheduling of analyses that cannot be performed at the same time.

Figure 4:
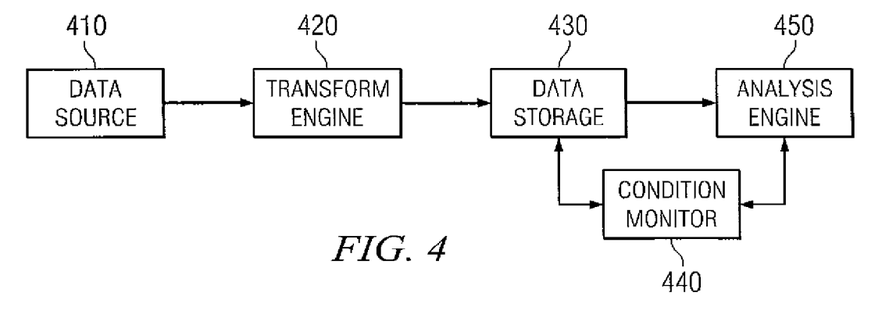
FIG. 4 is a functional block diagram illustrating a system for collecting, examining and analyzing data in accordance with an alternative embodiment.

Referring to FIG. 4, a functional block diagram of an alternative embodiment is shown. In this embodiment, data source 410 generates data which is provided to transformation engine 420. Transformation engine 420 processes the data received from data source 410 and categorizes the data. The categorized data is then passed to data storage 430, which collects the data and stores it according to the appropriate categories. In one embodiment, each category of data is stored as a separate collection of data (e.g., as a separate database table).

Condition monitor 440 then examines the categorized data that is collected by data storage 430 and determines whether any of the predetermined conditions which will trigger corresponding analyses are met. If condition monitor 440 detects one of the predetermined conditions, it signals analysis engine 450 to initiate the appropriate analysis. As with the embodiment discussed above, the data which is necessary for this analysis may be retrieved by analysis engine 450 from data storage 430, or the data may simply be forwarded from data storage 430 or condition monitor 440 to analysis engine 450.

Transformation engine 420 may categorize the data generated by data source 410 in a variety of ways. For instance, that data may be categorized according to dates, accounts, personnel, customers, data type, or any other characteristic associated with the data. Any such characteristics can be used as the basis for a mapping of the data from data source 410 into the sub-components (e.g., storage devices, database tables, memory partitions, or the like) of data storage 430. The categorization and/or mapping of data from data source 410 to data storage 430 is considered, for the purposes of this disclosure, one type of transformation of the data.

While transformation engine 420 may, in some embodiments, simply categorize the data for storage in data storage 430, the data transformation performed by transformation engine 420 may be more extensive in other embodiments. In other words, rather than simply transforming a single volume of raw data into multiple, categorized sub-volumes, transformation engine 420 may convert the data itself to another form. For example, in one embodiment, data may be converted from a first unit of measure to a second unit of measure (e.g., sales in thousands of dollars to sales in millions of dollars). In another embodiment, additional data may be computed from the data generated by data source 410 (e.g., total sales and workforce size can be used to compute sales per capita in the workforce). In yet another embodiment, meta-data may be added to the data generated by data source 410 or derived therefrom. The meta-data may, for example, be related to the source of the data (e.g., the name of the server that provided the data) or other characteristics of the data itself (e.g., a data type associated with the data). Many other types of transformations are also possible.

Figure 5:
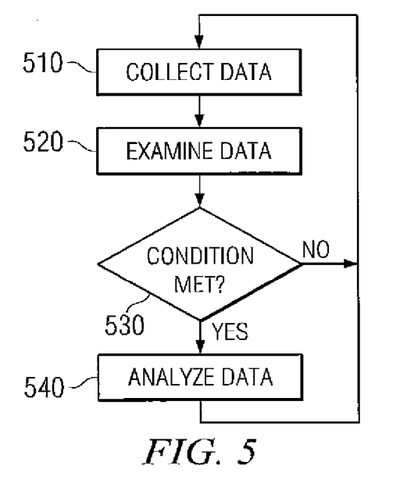
FIG. 5 is a flow diagram illustrating a method in accordance with one embodiment.

Referring to FIG. 5, a flow diagram illustrating a method in accordance with one embodiment of the invention shown. The flow diagram of FIG. 5 corresponds roughly to the system illustrated in FIG. 3. In this embodiment, the method comprises the basic steps of collecting data from the data sources (block 510), examining the collected data (block 520), determining whether or not any of the predetermined conditions that trigger analyses are met (block 530), and analyzing the appropriate data if one of the predetermined conditions is met (block 540). These steps are continually repeated.

Figure 6:
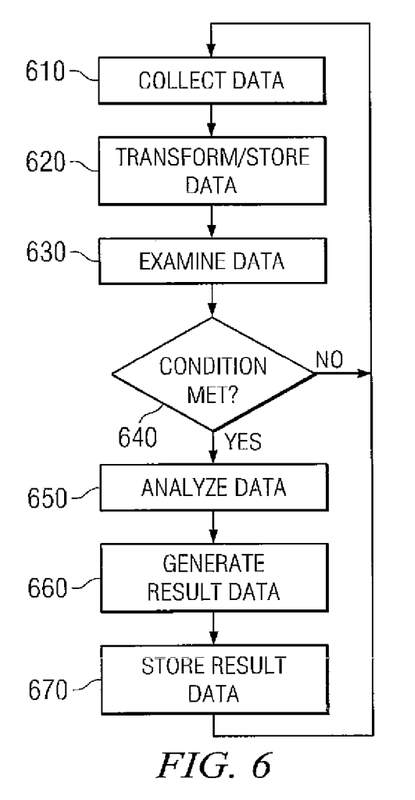
FIG. 6 is a flow diagram illustrating a method in accordance with an alternative embodiment.

Referring to FIG. 6, a flow diagram illustrating a method in accordance with an alternative embodiment of the invention is shown. The flow diagram of FIG. 6 corresponds roughly to the system illustrated in FIG. 4. In this embodiment, the method again begins with the collection of data from the data sources (block 610). After the data is collected, however, it is transformed (block 620). As noted above, transformation of the data may be as simple as categorizing the data, or it may be more complex (e.g., the computation of additional data values based upon the originally generated data). The transformed data is then examined (block 630), and it is determined whether any of the predetermined conditions that will trigger an analysis of the data are met (block 640).

If none of the predetermined conditions are met, data collection continues (block 610). If one of the conditions is met, the corresponding analysis is performed (block 650). After the data is analyzed (block 650), data corresponding to the results of the analysis is generated (block 660). This resulting data can then be published or otherwise provided to a user, or it can be stored (block 670) in the same manner as the originally collected data (block 610). It should be noted that the data resulting from the analyses can be transformed (block 620) and examined (block 630), and may be used to determine whether or one or more of the predetermined conditions is met. The data resulting from the analyses may therefore trigger subsequent analyses. The method may thereby perform analyses in a recursive fashion.

It should be noted that, as indicated above with respect to FIG. 1, some embodiments of the invention may be implemented in environments which include multiple data analysis devices (e.g., 141-143). The multiple data analysis devices may operate independently (e.g., each handling a different set of analyses), or they can interact with each other in performing one or more of the analyses that are triggered by the detected, predetermined conditions, or they may do both.

In one embodiment, one of the data analysis devices comprises a master device that controls performance of a certain type of analysis. In this embodiment, the master device receives the notification that the analysis is to be performed, and then delegates sub-tasks within the framework of the analysis to one or more other data analysis devices. The delegation of the sub-tasks may be accomplished in various ways. For example, in one embodiment, the master device may receive the data to be analyzed, and may then redistribute this data, along with an indication of the sub-tasks to be performed, to each of the non-master devices. Alternatively, the master device may send to each of the other devices an indication of the sub-tasks to be performed, along with certain parameters relating to the data (similar to a function call). In another alternative embodiment, the master device may send to the other devices data or corresponding parameters, along with the actual code for the analysis to be performed. By providing code along with the data (or parameters) to the other devices, the master device may be able to achieve greater flexibility in the use of these resources (the other data analysis devices). This may also relieve the additional data analysis devices of having to store code that is not currently being used, and may also serve as a security measure, if it is desired to prevent disclosure of the code, since the code would not be resident on the additional analysis devices.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. The information and signals may be communicated between components of the disclosed systems using any suitable transport media, including wires, metallic traces, vias, optical fibers, and the like.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs) or other logic devices, application specific integrated circuits (ASICs), field programmable gate arrays (FPGAs), discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of the methods or algorithms described in connection with the embodiments disclosed herein may be embodied directly in hardware, in software or firmware modules executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method comprising:
   collecting a set of business data from a plurality of data generating devices residing on a distributed computer network;
   storing the collected business data in a database;
   monitoring the stored collected business data to determine whether one or more predetermined conditions are met, wherein one or more of the one or more predetermined conditions comprises the occurrence of an event related to the data, the receipt of one or more pieces of the set of business data, and a schedule;
   upon detection of one or more of the one or more predetermined conditions, initiating one or more analyses of the collected business data wherein the one or more analyses correspond to the one or more predetermined conditions, wherein an analysis comprises one or more of generating additional data for further analysis, determining revenues associated with the data and determining effectiveness of resources associated with the data;
   examining data resulting from the one or more analyses to determine whether one or more of the one or more predetermined conditions are met;
   if a predetermined condition is met, initiating at least one additional analysis on the set of business data; and
   storing analysis data resulting from one or more of the one or more analyses and the at least one additional analysis on a computer readable medium.

2. The method of claim 1, further comprising transforming the collected business data and storing the transformed collected business data.

3. The method of claim 2, wherein transforming the collected business data comprises categorizing the collected business data and wherein storing the transformed collected business data comprises storing the collected business data according to one or more categories.

4. The method of claim 2, wherein transforming the collected business data comprises computing additional data based upon the collected business data.

5. The method of claim 1, further comprising examining the collected business data, wherein determining whether the one or more predetermined conditions are met is based at least in part on the examination of the collected business data.

6. The method of claim 1, wherein determining whether one or more predetermined conditions are met comprises determining whether predetermined data has been collected.

7. The method of claim 1, where initiating one or more analyses of the collected business data comprises providing a notification to an analysis engine that a corresponding one of the one or more predetermined conditions has been met.

8. The method of claim 1, further comprising transforming the data resulting from the one or more analyses.

9. The method of claim 1, further comprising, in response to at least one of the one or more analyses of the collected business data being initiated, distributing information from a first analysis device to at least one other analysis device, wherein the first analysis device and the at least one other analysis device each performs a portion of the at least one of the one or more analyses.

10. The method of claim 1, wherein the initiation of the one or more corresponding analyses is recursive.

11. The method of claim 1, wherein the business data includes at least one of sales data, revenue data, customer data, purchase orders or marketing data collected in the ordinary course of business irrespective of the first and second set of conditions.

12. A system comprising:
a data source configured to generate a set of business data independent of one or more analyses applied to the set of business data;
an analysis engine configured to initiate one or more analyses of sets of data that include the set of business data; and
a condition monitor;
wherein the data source, the analysis engine, and the condition monitor reside on a distributed computer network;
wherein the condition monitor is configured to monitor the stored collected business data to determine whether one or more of the one or more predetermined conditions has been met, wherein one or more of the one or more predetermined conditions comprises the occurrence of an event related to the data, the receipt of one or more pieces of the set of business data, and a schedule; and
wherein the condition monitor is operable to, upon detection of a condition being met, signal the analysis engine to initiate one or more analyses of the first set of business data, wherein an analysis comprises one or more of generating additional data for further analysis, determining revenues associated with one of the sets of data and determining effectiveness of resources associated with one of the sets of business data,
wherein the condition monitor is operable to examine the data resulting from the one or more analyses to determine whether any of the predetermined conditions are met,
wherein the analysis engine is further operable to, upon determination that a predetermined condition is met, initiate at least one additional analysis on the set of business data.

13. The system of claim 12, further comprising a transformation engine operable to transform the business data, and a storage device configured to store the transformed business data.

14. The system of claim 13, wherein the transformation engine is operable to transform the business data by categorizing the business data and wherein the storage device is operable to store the transformed business data according to one or more categories.

15. The system of claim 14, wherein the transformation engine is operable to transform the business data by computing additional data based upon the business data.

16. The system of claim 12, wherein the condition monitor is operable to examine the business data, wherein determining whether the one or more predetermined conditions are met is based at least in part on the examination of the business data.

17. The system of claim 12, wherein the condition monitor is operable to determine whether the one or more predetermined conditions are met by determining whether an event has occurred.

18. The system of claim 12, wherein the condition monitor is operable to determine whether the one or more predetermined conditions are met by determining whether predetermined data has been collected.

19. The system of claim 12, wherein the condition monitor is operable to initiate one or more analyses of the business data comprises by providing a notification to the analysis engine that a corresponding one of the one or more predetermined conditions has been met.

20. The system of claim 12, wherein at least a portion of analysis data produced by the analysis engine is collected, wherein determining whether at least one of the one or more conditions are met is based upon the collected analysis data.

21. The system of claim 12, wherein the analysis engine comprises a first analysis device and at least one other analysis device, wherein the first analysis device, in response to initiation of at least one of the one or more analyses of the data, distributes information to the at least one other analysis device, wherein the first analysis device and the at least one other analysis device each performs a portion of the at least one of the one or more analyses.

22. The system of claim 12, wherein the initiation of the one or more corresponding analyses is recursive.

23. A method comprising:
collecting a set of business from a plurality of data generating devices residing on a distributed computer network;
storing the collected business data in a database;
monitoring the stored collected business data to determine whether one or more predetermined conditions are met, wherein one or more of the one or more predetermined conditions comprises the occurrence of an event related to the data, the receipt of one or more pieces of the set of business data, and a schedule;
upon detection of the one or more predetermined condition, initiating one or more analyses of the stored collected business data, wherein an analysis comprises one or more of generating additional data for further analysis, determining revenues associated with the data and determining effectiveness of resources associated with the data, wherein the business data includes at least one of sales data, revenue data, customer data, purchase orders or marketing data collected in the ordinary course of business irrespective of the one or more predetermined conditions;
examining data resulting from the one or more analyses to determine whether one or more of the one or more predetermined conditions are met;
if a predetermined condition is met, initiating at least one additional analysis on the same stored collected business data and storing data from one or more of the analysis of the business data and the at least one additional analysis on a computer readable medium.

24. The method of claim 23, wherein collecting and storing the business data comprises transforming the collected business data and storing the transformed collected business data.

25. The method of claim 23, wherein transforming the collected business data comprises categorizing the collected business data and wherein storing the transformed collected business data comprises storing the collected business data according to one or more categories.

26. The method of claim 23, wherein transforming the collected business data comprises computing additional data based upon the collected business data.

27. The method of claim 23, further comprising examining the collected business data, wherein determining whether the one or more predetermined conditions are met is based at least in part on the examination of the collected business data.

28. The method of claim 23, wherein determining whether one or more predetermined conditions are met comprises determining whether predetermined data has been collected.

29. The method of claim 23, wherein initiating one or more analyses of the collected business data comprises providing a notification to the analysis engine that a corresponding one of the one or more predetermined conditions has been met.

30. The method of claim 23, further comprising transforming the data resulting from the one or more analyses.

31. The method of claim 23, further comprising, in response to at least one of the one or more analyses of the collected business data being initiated, distributing information from a first analyses device to at least one other analysis device, wherein the first analysis device and the at least one other analysis device each performs a portion of the at least one of the one or more analyses.

32. The method of claim 23, wherein the initiation of the one or more corresponding analyses is recursive.

33. The method of claim 23, wherein initiating one or more analyses of the collected business data comprises providing a notification to the analysis engine that a corresponding one of the one or more predetermined conditions has been met.

34. A computer readable medium, comprising instructions translatable for:
collecting a set of business data from a plurality of data generating devices residing on a distributed computer network;
storing the collected business data in a database;
monitoring the stored collected business data to determine whether one or more predetermined conditions are met, wherein one or more of the one or more predetermined conditions comprises the occurrence of an event related to the data, the receipt of one or more pieces of the set of business data, and a schedule;
upon detection of the one or more predetermined conditions, initiating one or more analyses of the stored collected business data, wherein an analysis comprises one or more of generating additional data for further analysis, determining revenues associated with the data and determining effectiveness of resources associated with the data;
examining data resulting from the one or more analyses to determine whether any of the predetermined conditions are met;
if a predetermined condition is met, initiating at least one additional analysis on the data resulting from the one or more analyses; and
storing data resulting from one or more of the analysis of the business data and the at least one additional analysis on the computer readable medium.

35. The computer readable medium of claim 34, further comprising transforming the collected business data and storing the transformed data.

36. The computer readable medium of claim 34, wherein transforming the collected business data comprises categorizing the collected business data and wherein storing the transformed data comprises storing the collected data according to one or more categories.

37. The computer readable medium of claim 34, wherein transforming the collected business data comprises computing additional data based upon the collected business data.

38. The computer readable medium of claim 34, further comprising examining the collected business data, wherein determining whether the one or more predetermined conditions are met is based at least in part on the examination of the collected business data.

39. The computer readable medium of claim 34, wherein determining whether one or more predetermined conditions are met comprises determining whether predetermined data has been collected.

40. The computer readable medium of claim 34, further comprising transforming the data resulting from the one or more analyses.

41. The computer readable medium of claim 34, further comprising, in response to at least one of the one or more analyses of the collected business data being initiated, distributing information from a first analysis device to at least one other analysis device, wherein the first analysis device and the at least one other analysis device each performs a portion of the at least one of the one or more analyses.

42. The computer readable medium of claim 34, wherein the initiation of the one or more corresponding analyses is recursive.

43. The compute readable medium of claim 34, wherein the business data includes at least one of sales data, revenue data, customer data, purchase orders or marketing data collected in the ordinary course of business irrespective of the first and second set of conditions.

44. A computer readable medium, comprising instructions translatable for:
collecting a set of business data from a plurality of data generating devices residing on a distributed computer network;
storing the set of collected business data in a database;
monitoring the set of stored collected business data to determine whether one or more predetermined conditions are met, wherein one or more of the one or more predetermined conditions comprises the occurrence of an event related to the data, the receipt of one or more pieces of the set of business data, and a schedule;
upon detection of the one or more predetermined condition, initiating one or more analyses of the stored collected business data, wherein an analysis comprises one or more of generating additional data for further analysis, determining revenues associated with the data and determining effectiveness of resources associated with the data, wherein the business data includes at least one of sales data, revenue data, customer data, purchase orders or marketing data collected in the ordinary course of business irrespective of the one or more predetermined conditions;
examining data resulting from the one or more analyses to determine whether any of the predetermined conditions are met;

if a predetermined condition is met, initiating at least one additional analysis on the collected business data; and storing resulting data from one or more of the analysis of the business data and the at least one additional analysis on the computer readable medium.

45. The computer readable medium of claim 44, further comprising transforming the collected business data and storing the transformed collected business data.

46. The computer readable medium of claim 44, wherein transforming the collected business data comprises categorizing the collected business data and wherein storing the transformed data comprises storing the collected business data according to one or more categories.

47. The computer readable medium of claim 44, wherein transforming the collected business data comprises computing additional data based upon the collected business data.

48. The computer readable medium of claim 44, wherein the instructions are translatable for: examining the collected business data, wherein determining whether the one or more predetermined conditions are met is based at least in part on the examination of the collected business data.

49. The computer readable medium of claim 44, wherein determining whether one or more conditions are met comprises determining whether predetermined data has been collected.

50. The computer readable medium of claim 44, wherein initiating one or more analyses of the collected business data comprises providing a notification to the analysis engine that a corresponding one of the one or more predetermined conditions has been met.

51. The computer readable medium of claim 44, wherein data resulting from at least one of the one or more analyses is collected, wherein determining whether at least one of the one or more conditions are met is based upon the collected analysis result data.

52. The computer readable medium of claim 44, wherein the instructions are further translatable for: in response to at least one of the one or more analyses of the collected data being initiated, distributing information to at least one other analysis device, wherein the first analysis device and the at least one other analysis device each performs a portion of the at least one of the one or more analyses.

53. The computer readable medium of claim 44, wherein the initiation of the one or more corresponding analyses is recursive.

* * * * *